US010832586B2

(12) United States Patent
Afzal et al.

(10) Patent No.: US 10,832,586 B2
(45) Date of Patent: Nov. 10, 2020

(54) PROVIDING PARTIAL ANSWERS TO USERS

(71) Applicant: International Business Machines Corporation, Armonk, NY (US)

(72) Inventors: Shazia Afzal, New Delhi (IN); Jae-wook Ahn, Nanuet, NY (US); Maria D. Chang, Irvington, NY (US); Renuka R. Sindhgatta, Bangalore (IN); Patrick D. Watson, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 834 days.

(21) Appl. No.: 15/486,062

(22) Filed: Apr. 12, 2017

(65) Prior Publication Data
US 2018/0301050 A1   Oct. 18, 2018

(51) Int. Cl.
*G09B 7/02* (2006.01)
(52) U.S. Cl.
CPC ...................... *G09B 7/02* (2013.01)
(58) Field of Classification Search
CPC .......................................... G09B 7/02
See application file for complete search history.

(56) References Cited

U.S. PATENT DOCUMENTS

| 9,299,265 | B2 | 3/2016 | Kellman |
| 2004/0018479 | A1 | 1/2004 | Pritchard et al. |
| 2005/0266387 | A1 | 12/2005 | Rossides |
| 2008/0286737 | A1* | 11/2008 | Cheng ...................... G09B 7/00 434/322 |
| 2010/0255455 | A1* | 10/2010 | Velozo ...................... G09B 7/00 434/362 |
| 2011/0065082 | A1 | 3/2011 | Gal et al. |
| 2012/0052476 | A1 | 3/2012 | Graesser et al. |
| 2013/0035931 | A1 | 2/2013 | Ferrucci et al. |
| 2014/0024008 | A1* | 1/2014 | Sathy ...................... G09B 7/00 434/362 |
| 2014/0272905 | A1 | 9/2014 | Boersma |
| 2015/0079554 | A1 | 3/2015 | Lee et al. |

(Continued)

OTHER PUBLICATIONS

Price et al., "Generating Data-driven Hints for Open-ended Programming." Proceedings of the 9th International Conference on Educational Data Mining, International Educational Data Mining Society, Raleigh, North Carolina, USA (Jun. 29, 2016-Jul. 2, 2016), pp. 191-198.

*Primary Examiner* — Nathan Hillery
(74) *Attorney, Agent, or Firm* — Intelletek Law Group, PLLC; Gabriel Daniel, Esq.

(57) ABSTRACT

A method and system of interactive tutoring is provided. A question is sent to a user device. Upon determining that the response does not correspond to a known correct answer, a concept map is identified and a cost function between the correct answer and the response is determined. Upon determining that the cost function between the correct answer and the response is above a predetermined threshold, the question is identified to be the origin. Otherwise, the response is identified to be the origin. A present academic proficiency of the student is determined. A difficulty boundary based on the academic proficiency of the student is determined. A next question is provided between the origin and the correct answer, based on the determined difficulty boundary of the student.

18 Claims, 6 Drawing Sheets

(56) References Cited

U.S. PATENT DOCUMENTS

| | | | |
|---|---|---|---|
| 2015/0356420 A1* | 12/2015 | Byron | G06N 5/04 |
| | | | 706/12 |
| 2016/0019293 A1* | 1/2016 | Bhagwat | G06F 16/3344 |
| | | | 707/732 |
| 2016/0188572 A1* | 6/2016 | Clark | G06F 40/40 |
| | | | 434/319 |
| 2016/0203208 A1* | 7/2016 | Anderson | G06F 16/285 |
| | | | 707/722 |
| 2016/0283494 A1* | 9/2016 | Krishnaswamy | G06F 16/3334 |
| 2016/0293036 A1* | 10/2016 | Niemi | G09B 7/077 |
| 2016/0358489 A1* | 12/2016 | Canter | G09B 5/00 |
| 2017/0011646 A1* | 1/2017 | Galen | G09B 7/08 |
| 2017/0206797 A1* | 7/2017 | Solomon | G09B 7/08 |

\* cited by examiner

PROVIDING PARTIAL ANSWERS TO USERS

BACKGROUND

Technical Field

The present disclosure generally relates to learning systems, and more particularly, to interactive and intelligent learning systems that are adaptive to a student.

Description of the Related Art

Traditionally, an educator (e.g., a teacher, a parent or a coach; hereinafter "a teacher") is physically present with a student so that the teacher can assess a performance thereof. As technology progresses, however, more and more education takes place in a computerized environment or scenario, where a teacher may not be individually interacting with a student. In some cases, a teacher may not even be a human being, and a student may be learning through or from a machine having a certain level of intelligence, such as an electronic learning console or a computer. Such systems, sometimes referred to as intelligent tutoring systems (ITS), can interact with a student to teach various subject matters. Some ITS can give students context-sensitive feedback during problem solving in the form of hints.

SUMMARY

According to various embodiments, a computing device, a non-transitory computer readable storage medium, and a method are provided to provide interactive tutoring to a student. A question is sent to a user device of a student such that the question is provided on a user interface of the user device. A response to the question is then received from the user device. Upon determining that the response does not correspond to a known correct answer, a concept map is identified. A cost function between the correct answer and the response from the concept map is determined. Upon determining that the cost function between the correct answer and the response is above a predetermined threshold, the question is identified to be the origin. However, upon determining that the cost function between the correct answer and the response is at or below the predetermined threshold, the response from the student is identified to be the origin. A present academic proficiency of the student is determined. A difficulty boundary based on the academic proficiency of the student is determined. The next question is then provided based on the determined difficulty boundary of the student.

According to one embodiment, one or more knowledge paths between the origin and the correct answer are created and the knowledge path that is selected is from the one or more knowledge paths is the one with a lowest cost factor.

According to one embodiment, the difficulty boundary of a new question based on a predetermined number of correctly answered questions along the selected knowledge path is adaptively adjusted.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure generally relates to computerized aiding of a student during a learning process. Natural language processing (NLP) is used to determine a state of knowledge of a student with respect to an inquiry to guide the student to better understand the subject matter. NLP is a field of artificial intelligence, computer science, and computational linguistics that deals with the interaction between a human (i.e., the natural element) and computers. When a student is stuck, or does not understand a challenge (e.g., a teacher's inquiry), a traditional ITS typically does not provide intelligent guidance based on the identified present academic proficiency of the student. Rather, there are predetermined answers or hints for certain questions that are generally not sensitive to the degree of understanding of the student. In this regard, methods and systems are provided that use NLP to generate partial (e.g., pseudo) answers, when appropriate. These questions are operative to guide the student to the correct answer based on their identified present academic proficiency with the subject matter. The difficulty of each iterative question is dynamically adjusted to accommodate the capability of the student.

Reference now is made in detail to the examples illustrated in the accompanying drawings and discussed below.

Example Architecture

Figure 1:
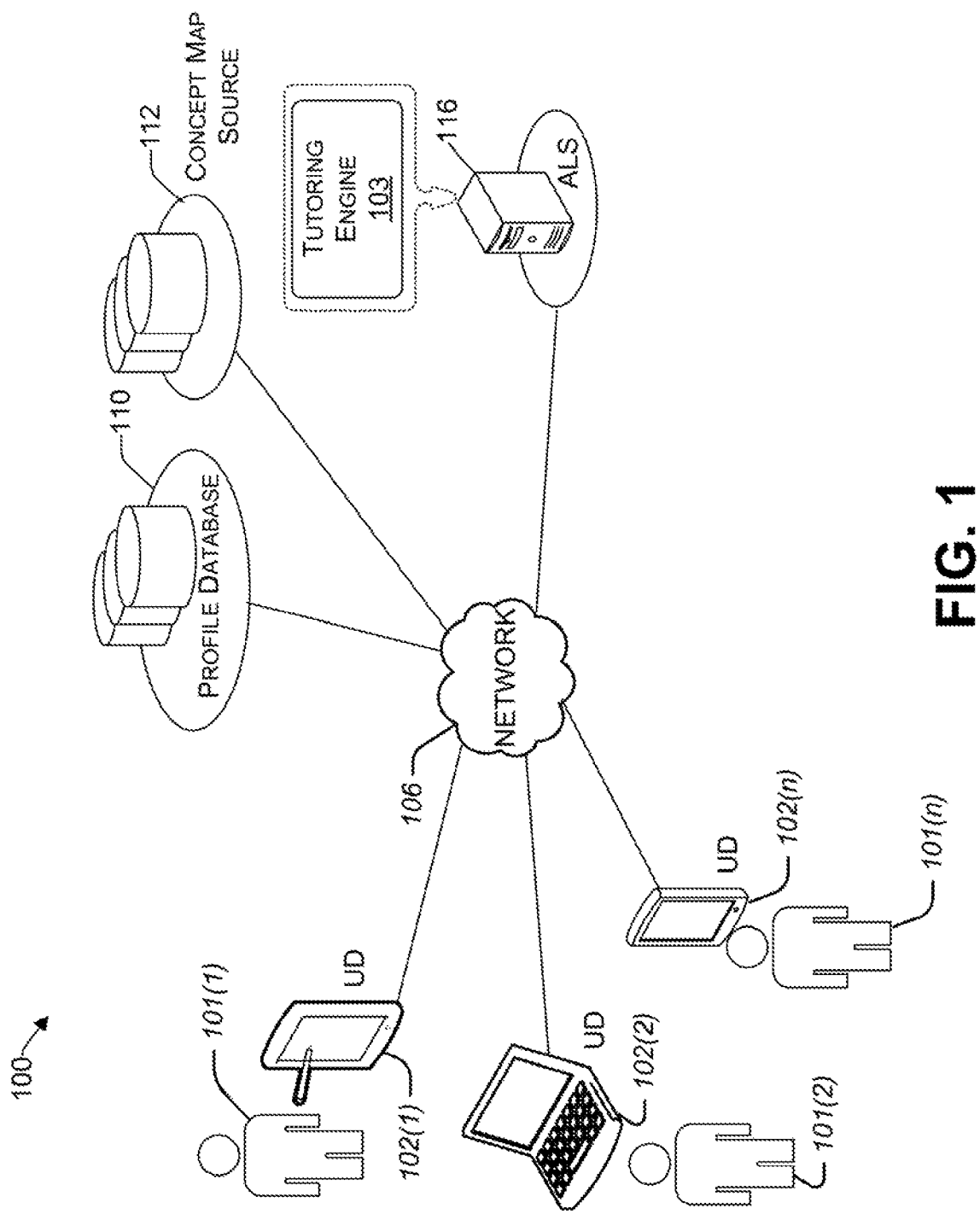
FIG. 1 illustrates an example architecture for implementing an interactive learning system.

FIG. 1 illustrates an example architecture 100 for implementing an interactive learning system. Architecture 100 includes a network 106 that allows various user device 102(1) to 102(n) to communicate with each other, as well as any other components that are connected to the network 106, such as an advanced learning server (ALS) 116, a student profile database 110, and a concept map source 112.

The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet that provides various ancillary services, such as communication with various application stores, libraries, and the Internet. To facilitate the present discussion, network 106 will be described, by way of example only and not by way of limitation, as a mobile network as may be operated by a carrier or service provider to provide a wide range of mobile communication services and supplemental services or features to its subscriber customers and associated mobile device users. The network 106 allows the tutoring engine running on the ALS 116 to communicate with one or more users 101(1) to 101(n), referred to herein as students, over their user devices (UD's) 102(1) to 102(n), respectively, to provide an interactive and adaptive learning environment.

For purposes of later discussion, several user devices appear in the drawing, to represent some examples of the devices that may receive various services via the network 106. Today, user devices typically take the form of portable handsets, smart-phones, tablet computers, personal digital assistants (PDAs), and smart watches, although they may be implemented in other form factors, including consumer, and business electronic devices.

A user device (e.g., 102(1)) may have various applications stored in its memory and may supplement these applications, including a learning application (app), discussed in more detail later. The learning app may interact with the tutoring engine 103 over the network 106 to provide questions on a user interface of the user device (e.g., 101(1)) and to receive responses from a student (e.g., 101(1)) such that an interactive environment is created between the tutoring engine 103 and the student (e.g., 101(1)).

In one embodiment, there is a profile management database 110 that has information regarding a student's past performance for various subject matters. Example indicia of performance include grades, test scores, teacher input, class standing, whether there is an individual education program (IEP) etc. for different academic fields. The tutoring engine 103 can refer the academic data of a student (e.g., 101(1)) to determine a present academic proficiency of the student to adjust the difficulty level of the curriculum, accordingly.

In one embodiment, there is a concept map source 112, which may act as a repository and/or generator of concept maps. Concept maps, sometimes referred to as linguistic maps, include the meaning of a type of graphic organizer that are used to help organize and represent a body of knowledge related to a subject. Concept maps begin with a main idea (i.e., concept) and then branch out to show how that main idea can be broken down into specific topics. A concept map may include various knowledge paths between a question and a known correct answer and various possible partial answers. Knowledge paths are discussed in more detail later.

These concept maps may be used by the tutoring engine 103 to adaptively adjust the curriculum such that it accommodates the identified present academic proficiency of a student on an individual basis. For example, by generating a graph of knowledge entities in each concept map space and calculating a path between entities that represent a question and an answer, the concept map can reveal any knowledge entities on the path as partial answers and facilitate the tutoring engine 103 to guide the student to navigate through to the final knowledge destination by providing one or more hints in the form of questions. Knowledge entities can be viewed as steps in a linguistic map between a question and an answer. It is a piece of fact that is relevant to the question posed and/or the answer provided by the student.

During such navigation via the tutoring engine, students can learn what knowledge is salient to reach the answer. Concept maps also illustrate how knowledge entities are inter-related to each other, so that they can acquire much richer set of knowledge. Examples of concept maps are discussed in detail later.

While the profile database 110, the concept map source 112, and the advanced learning server 116 are illustrated by way of example to be on different platforms, it will be understood that in various embodiments, the application database and the library database may be combined in various combinations. In other embodiments, these computing platforms may be implemented by virtual computing devices in the form of virtual machines or software containers that are hosted in a cloud, thereby providing an elastic architecture for processing and storage.

Example User Device

Figure 2:
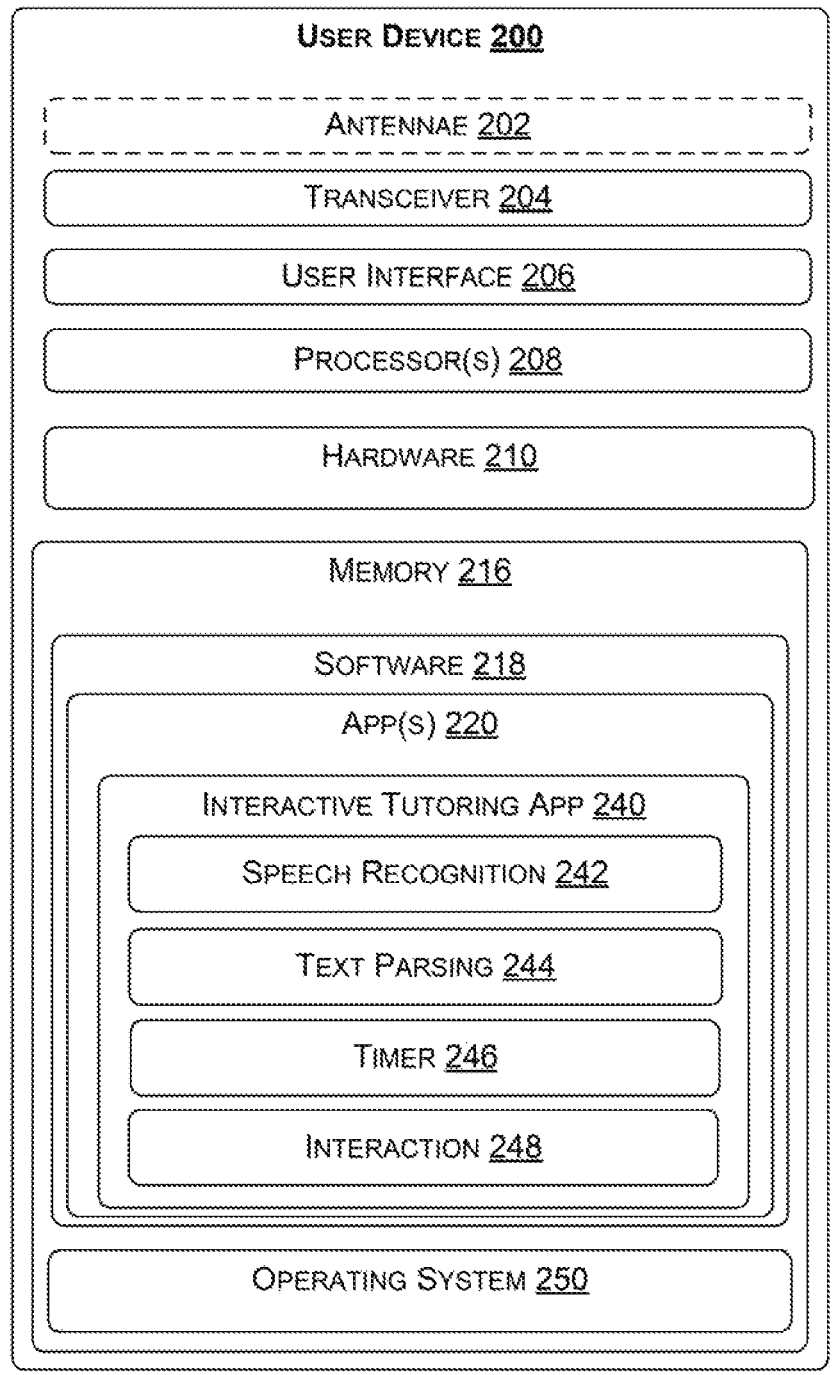
FIG. 2 illustrates a block diagram showing various components of an illustrative user device at a high level.

As discussed in the context of FIG. 1, the interactive learning system in the architecture 100 may involve different types of user devices. To that end, FIG. 2 illustrates a block diagram showing various components of an illustrative user device 200 at a high level. For discussion purposes, the illustration shows the user device 200 in the form of a wireless computing device.

The user device 200 may include one or more antennae 202; a transceiver 204 for cellular, Wi-Fi communication, and/or wired communication; a user interface 206; one or more processors 208; hardware 210; and memory 216. In some embodiments, the antennae 202 may include an uplink antenna that sends radio signals to a base station, and a downlink antenna that receives radio signals from the base station. In some other embodiments, a single antenna may both send and receive radio signals. The same or other antennas may be used for Wi-Fi communication. These signals may be processed by the transceiver 204, sometimes collectively referred to as a network interface, which is configured to receive and transmit digital data. In one embodiment, the user device 200 does not include an antenna 202 and communication with external components is via wired communication.

In one embodiment, the user device 200 includes a user interface 206 that enables a student to provide input and receive output from the user device 200. For example, the user interface 206 may include a data output device (e.g., visual display, audio speakers, haptic device, etc.) that may be used to display notifications from the tutoring engine 103 of the ALS 116. The user interface 206 may also include one or more data input devices. The data input devices may include, but are not limited to, combinations of one or more of keypads, keyboards, mouse devices, touch screens, microphones, speech recognition packages, and any other suitable devices or other electronic/software selection interfaces. For example, the data input devices may be used to receive a response to a question posed by the tutoring engine 103 during a tutoring session.

The user device 200 may include one or more processors 208, which may be a single-core processor, a multi-core processor, a complex instruction set computing (CISC) processor, or another type of processor.

The hardware 210 may include a power source and digital signal processors (DSPs), which may include single-core or multiple-core processors. The hardware 210 may also include network processors that manage high-speed communication interfaces, including communication interfaces that interact with peripheral components. The network processors and the peripheral components may be linked by switching fabric. The hardware 210 may further include hardware decoders and encoders, a network interface controller, and/or a universal serial bus (USB) controller.

The memory 216 may be implemented using computer-readable media, such as computer storage media. Storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video storage disks, or other optical storage, magnetic cassettes, magnetic tape, magnetic disk storage or other magnetic storage devices, or any other non-transmission medium that can be used to store information for access by a computing device.

The memory 216 may store various software components or modules that are executable or accessible by the processor (s) 208 and controller(s) of the user device 200. The various components of the memory 216 may include software 218 and an operating system 250. The software 218 may include various applications 220. The software 218 may also include an interactive tutoring application 240 having several modules. Each module may include routines, program instructions, objects, and/or data structures that perform tasks or implement abstract data types.

For example, the interactive tutoring application 240 of the user device 200 may include a speech recognition module 242 that enables the recognition (and possible translation) of spoken language into text, such that it can be further processed by the interactive tutoring app 240 and/or the tutoring engine 103.

In one embodiment, the interactive tutoring application 240 includes a text parsing module 244 operative to provide electronic conversion of images that a student may type in response to an inquiry, into recognizable printed text and/or images. Accordingly, a student can choose to respond via a drawing or by simply entering information via a finger or stylus to communicate with the interactive tutoring application 240.

In one embodiment, the interactive tutoring application 240 includes a timer 246 operative to measure the time it takes for a student to respond. For example, if there is no response within a predetermined time, such dealy is considered an "incorrect" response for purposes of adjusting the curriculum to the student.

There is an interaction module 248 operative to receive messages (e.g., questions) from the tutoring engine 103 and to communicate the response from the student to the tutoring engine 103. In this way, the interactive tutoring application 240 can work in harmony with the tutoring engine 103.

The operating system 250 may include components that enable the user device 200 to receive and transmit data via various interfaces (e.g., user controls, communication interface, and/or memory input/output devices), as well as process data using the processors 208 to generate output. The operating system 250 may include a presentation component that presents the output (e.g., display the data on an electronic display of the user device 200, store the data in memory 216, transmit the data to another electronic device, etc.). Additionally, the operating system 250 may include other components that perform various additional functions generally associated with an operating system 250.

Example Concept Maps

Figure 3:
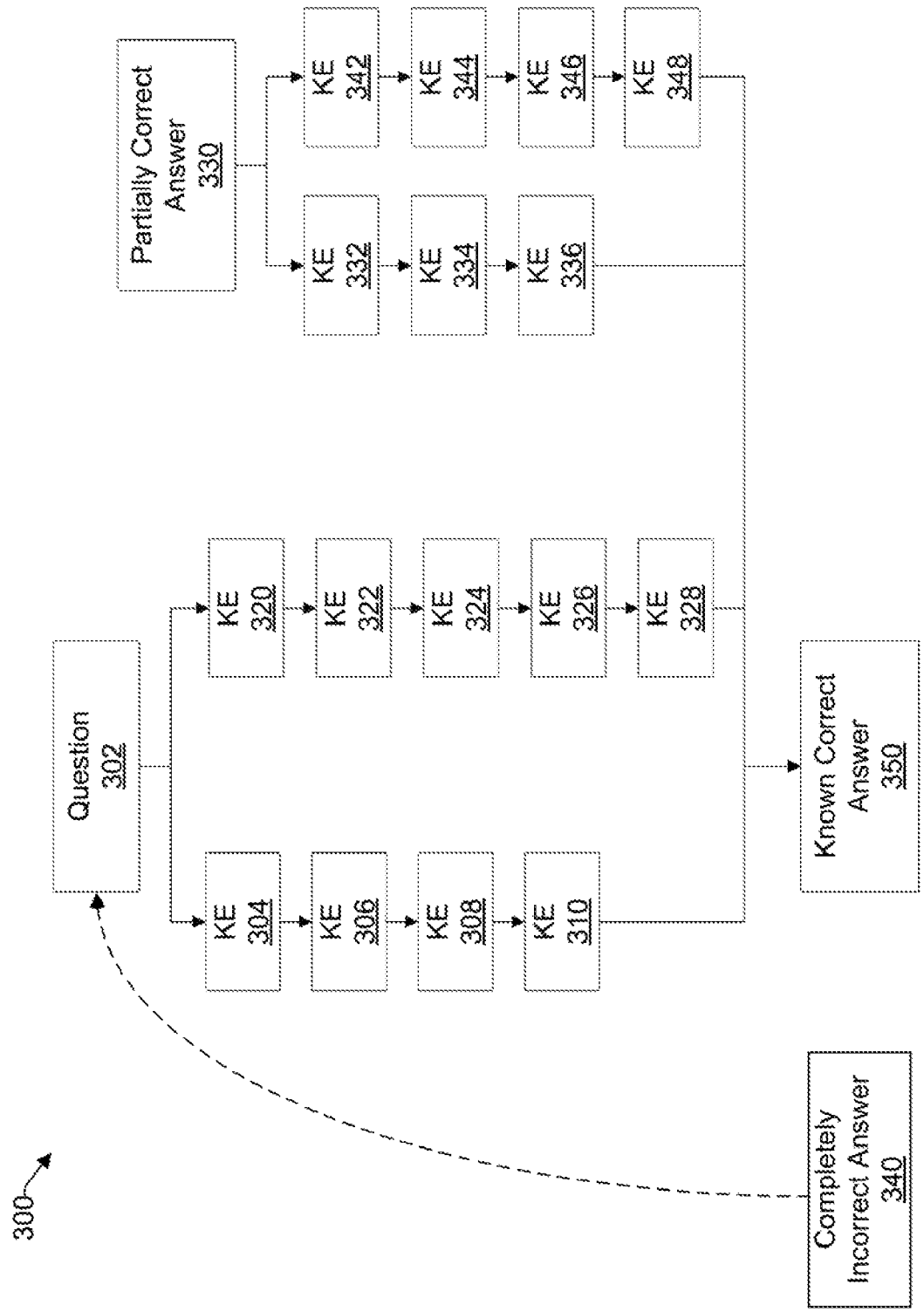
FIG. 3, which is an example concept map, consistent with an illustrative embodiment.

Reference now is made to FIG. 3, which is an example concept map 300, consistent with an illustrative embodiment. The example concept map 300 includes a question 302 (with a known correct answer 350) that may be posed by the tutoring engine 103 as part of a curriculum. The student can respond in different ways, namely: (i) with the known correct answer 350, (ii) with a partially correct answer, represented by way of example by block 330, and (iii) with a completely incorrect answer 340. A completely incorrect answer (or simply incorrect answer), is indicative that the student has not understood the question, has not responded to the question, or has provided an answer that indicates that the present academic proficiency of the student with respect to the subject matter of the question is low. The concept of the present academic proficiency of the student is further expounded later in the context of the discussion of cost functions.

A partially correct answer 330 is an answer that is not the known correct answer 350, but has a logical relationship to the known correct answer. Thus, there is a knowledge path 332 to 336 that ties the partially correct answer 330 to the known correct answer. As used herein, a knowledge path is a path between an origin and a destination (i.e., the known correct answer) that is separated by knowledge entities. The origin is the point of the highest cost function for the chosen knowledge path, because it is the farthest away from the destination. A knowledge entity (KE) is a step in a linguistic map between an origin (e.g., 302 or 330) and the known correct answer 350. It is one or more knowledge facts that link steps together in a knowledge path.

In one embodiment, whether an answer provided by a student in response to the question 302 is considered incorrect 340 or partially correct 330 depends on whether the cost function between the answer and the correct answer is within a predetermined threshold. For example, if there is no knowledge path between the correct answer 350 and the answer provided by the student, then the tutoring engine 103 deems the answer provided by the student to be incorrect (as represented by block 340). The tutoring engine 103 can also deem the answer to be incorrect if the cost function between the answer provided and the known correct answer 350 is too high (e.g., the number of knowledge entities in between the origin and the destination exceed a predetermined threshold for this student).

The identification of whether the response by the student is partially correct 330 or completely incorrect 340 helps determine the origin and the appropriate knowledge path. For example, for an incorrect answer 340, the origin becomes the question 302 itself. However, if there is a partially correct answer 330, the origin becomes the partially correct answer 330. The destination is generally the known correct answer 350.

It will be understood that there may be several knowledge paths between an origin and a destination (i.e., known correct answer 350) in the multi-dimensional problem space of FIG. 3. A multi-dimensional system is a system where multiple variables or paths exist (instead of a single path).

For example, if a partially correct answer 330 is provided, both knowledge paths (i) 332 to 336 and (ii) 342 to 348 lead to the known correct answer 350. In one embodiment, the path that has the lowest cost function is selected. As used herein, the term cost function relates to the value of the path from the knowledge entity to the destination. The more knowledge elements a knowledge path has, the higher its knowledge value, and thus, its cost function. In the present example of FIG. 3, the knowledge path having knowledge elements 332 to 336 has a lower cost function than knowledge path 342 to 348. Accordingly, the former path is chosen to guide the student from their partially correct answer 330 to the known correct answer 350.

If an answer that is deemed to be completely incorrect 340 is provided by the student, the question 302 itself becomes the origin. Similar to the partially correct answer, in one embodiment, the path that has the lowest cost function (i.e., 304 to 310 instead of 320 to 328) is chosen by the tutoring engine 103 to guide the student to the known correct answer 350.

In various embodiments, a concept map, like the one 300 in the example of FIG. 3, can be prepared previously by professionals for a teaching subject, which is stored in the concept map source 112. Alternatively, or in addition, a concept map may be generated ad hoc in view of the subject matter being taught, the question posed, and the answer provided by the student. The concept map may take the form of a graph as in FIG. 3 or a continuous map, depending on the method used to generate the concept map.

In one example, the concept map source 112 can generate a concept map by calculating the linguistic similarities of the knowledge entitles (i.e., concepts), connect them through a specific rule, and cluster them to create one or more paths. The link information between the entities are used for the automatic partial answer generation.

Figure 4:
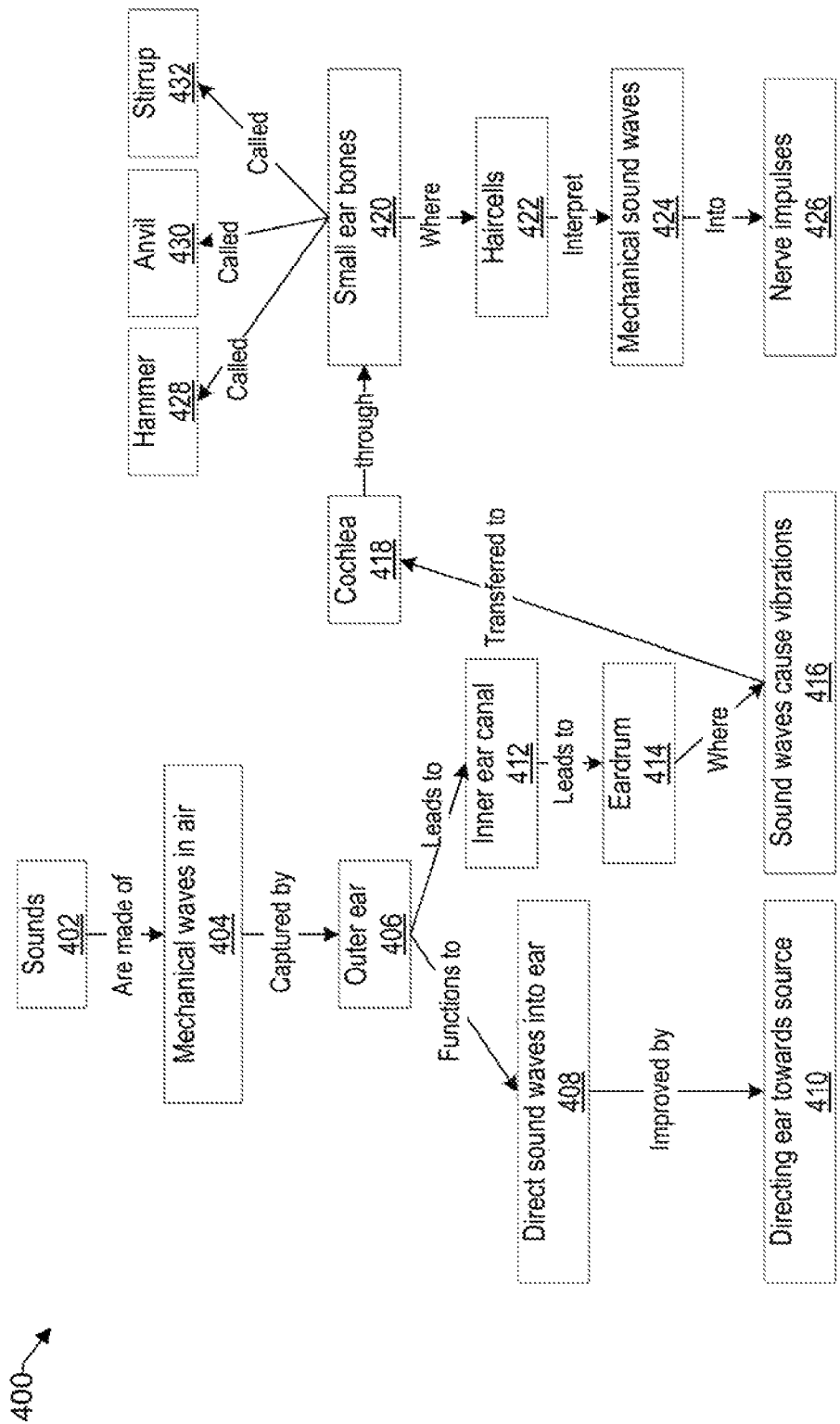
FIG. 4 is an example concept map that may be generated as part of an interactive learning experience of a student, consistent with an illustrative embodiment.

FIG. 4 is an example concept map that may be generated as part of an interactive learning experience of a student, consistent with an illustrative embodiment. For example, consider that the tutoring engine 103, as part of a curriculum for a student 101(1), asks a question via the user device 102(1): "What do hair cells detect?" The known correct answer is "sounds" represented by block 402. Instead, the student may respond with "Hair cells are in the cochlea." In various embodiments, the question may be provided on the user device 102(1) via an audio, visual, and/or haptic interface. The user device 102(1) may be used by the student 101(1) to provide the first response, which may be via audio, visual, and/or haptic interface. Accordingly, communication may be via visualization (e.g., text or images), physical interaction (e.g., brail, haptic feedback), or sound (e.g., voice recognition).

Upon determining that the response does not correspond to the desired answer 402 (i.e., sounds), the concept map 400 is used based on the question, the known correct answer 402, and the partial answer 422. The tutoring engine 103 then decides on a knowledge path that has the lowest cost function. For example, the knowledge path comprising knowledge elements 402, 404, 406, 412, 414, 416, 420 and 422 provides a path between the origin 422 (i.e., partially correct answer) and the destination 402 (i.e., known correct answer) based on the concept map 400.

The knowledge path includes a knowledge string, sometimes referred to herein as a "verbose answer" that includes the information of the knowledge elements and the link elements in between. For example, the following knowledge string may be created based on the question asked and the answer provided: "Sounds are made of mechanical waves in the air captured by the outer ear, which leads to the inner ear canal, which leads to the eardrum, where soundwaves cause vibrations, which are transferred to the cochlea through the small ear bones where hair cells." This knowledge string represents the body of knowledge that is to be instilled in the student such that the student is guided to the known correct answer 402. To that end, the appropriate shingle (i.e., portion of the knowledge string) is provided to the student as a hint, in the form of a question.

The correct hint (which may be presented in the form of a question) is provided based on the present state of knowledge, sometimes referred to herein as the present academic proficiency, of the student, which may be determined in different ways. In one embodiment, the present academic proficiency may be retrieved from the student profile database 110, which has information regarding a student's past performance for the relevant subject matter. This database 110 may indicate a difficulty boundary for the student for the present subject matter. This difficulty boundary may be calculated based on various academic factors or may be specified by an authorized educator (i.e., human) and stored in the student profile database 110. The difficulty boundary translates into a maximum cost function of the next question for the student. For example, the further away the next question to be posed to the student is from the origin, the higher the cost function. Thus, the difficulty boundary provides an upper limit for the cost function of the next question, measured from the origin in the direction of the destination.

In other embodiments, the present academic proficiency is determined by the tutoring engine 103 by how far the answer provided by the student is from the known correct answer. For example, the higher the cost function between the provided answer and the known correct answer in the path selected, the lower the present academic proficiency, and hence, the lower the difficulty boundary for the next question.

In one embodiment, the difficulty boundary is adaptively adjusted as the questions are posed to the student by the tutoring engine 103. For example, as a student is iteratively guided from the partial answer 422 to the known correct answer 402, after every predetermined number of inquiries (e.g., each, every second, etc.) along the selected knowledge path, the present academic proficiency is determined by the quality of the answer provided by the student, and the difficulty boundary is adjusted accordingly. For example, if the student was initially assigned a low present academic proficiency and hence a low difficulty boundary for questions posed, after answering a predetermined number of questions correctly (e.g., next 3), then the present academic proficiency of the student is deemed to be improved on an appropriate scale (e.g., from 1 to 2) and the difficulty boundary is adjusted, such that the next question has a higher cost function, thereby adaptively providing the student with a question that has a dynamically adjusted difficulty level. Of course, the difficulty boundary may be adjusted down if the student starts with a higher present academic proficiency estimate, but answers a predetermined number of questions incorrectly on the concept map 400.

For example, for a relatively low difficulty boundary, based on the answer provided by the student, the next question may be based on knowledge element 418, namely "what is transferred to the cochlea?" However, for a higher difficulty boundary, the question may be "where is the cochlea?"

Example Process

Figure 5:
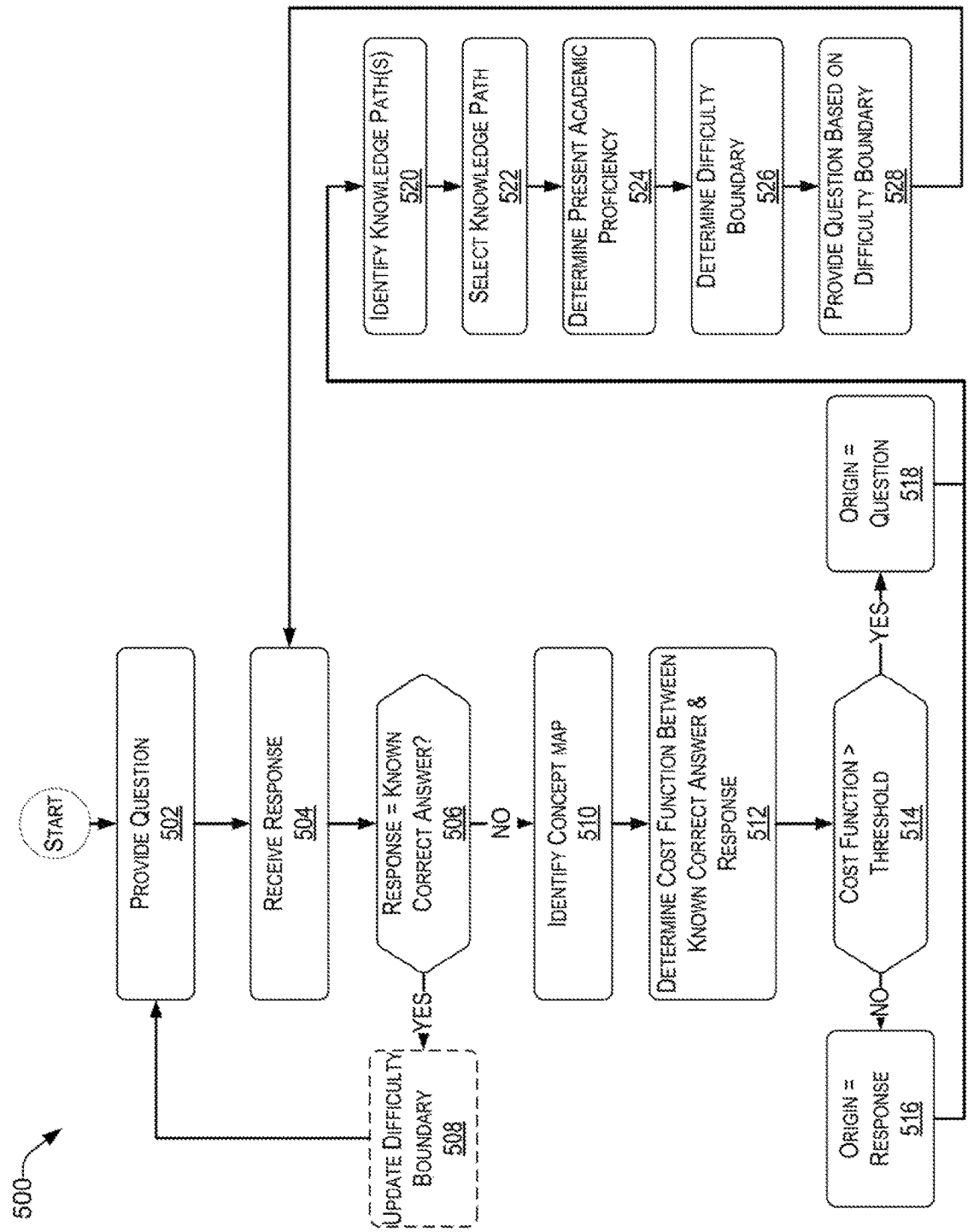
FIG. 5 presents an illustrative process for providing an interactive and intelligent tutoring system that is adaptive to the academic proficiency of a student.

With the foregoing overview of the architecture 100 and example concept maps 300 and 400, it may be helpful now to consider a high-level discussion of an example process. To that end, FIG. 5 presents an illustrative process 500 for providing an interactive and intelligent tutoring system that adapts to the academic proficiency of a student.

Processes 500 is illustrated as a collection of blocks in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. The order in which the operations are described is not intended to be construed as a limitation, and any number of the described blocks can be combined in any order and/or performed in parallel to implement the process. For discussion purposes, the process 500 is described with reference to the architecture 100 of FIG. 1.

At block 502, the tutoring engine 103 of the advanced learning server 116 interacts with the user device 102(1) of the student 101(1) to provide a first question related to a curriculum. This question is provided on an interface of the user device 102(1).

At block 504, the student 101(1) provides a response to the first question on a user interface of the user device 102(1) which is received by the tutoring engine 103 via a network 106.

At block 506, the tutoring engine 103 determines whether the received response corresponds to the known correct answer. If so (i.e., "YES" at decision block 506), the process proceeds back to block 502 to ask a next question that is part of the curriculum. In one embodiment, the difficulty boundary is updated (i.e., increased) if the response is part of a predetermined number of responses (e.g., 1, 2, 3, etc.) that are correctly answered by the student (block 508).

Upon determining that the response does not correspond to the known correct answer (i.e., "NO" at decision block 506), the process continues with block 510, where a concept map is identified based on at least one of (i) the first question, (ii) the known correct answer, (iii) the student response, and (iv) the subject matter of the question. In various embodiments, a concept map, can be based on one that was previously created by professional(s), referred to herein as an authorized educator, for a teaching subject, may be generated ad hoc in view of the subject matter being taught by the concept map source 112, or a combination thereof.

For example, the tutoring engine 103 can send relevant information, such as the subject matter, the question posed to the student, the answer provided by the student, etc., to the concept map source 112. The concept map source 112 can then either generate a concept map based on an existing algorithm(s), or select a pre-existing concept map that was generated by an authorized educator for the learning subject matter. In one embodiment, concept expansion, such as the IBM Watson concept expansion, can be used to create a concept map based on the information provided. Such concept expansion mimics the human ability to identify concept cues. Large sets of the unstructured sets of data that is provided, functions as the context to learn from. Such concept expansion enables the creation of a specialized dictionary for the cognitive application of identifying the scope of the question, the subject matter, and the answer provided by the student. In cases where a graph of connected concepts cannot be inferred, the cost function could be based on an alternative distance measure.

At block 512, a cost function is determined between the known correct answer and the response. Upon determining that the cost function between the known correct answer and the response is at or below the predetermined threshold (i.e., "NO" at decision block 514), the response becomes the origin (i.e., block 516). However, upon determining that the cost function between the known correct answer and the response is above a predetermined threshold (i.e., "YES" at decision block 514), the question becomes the origin (block 518).

At block 520, one or more knowledge paths are identified between the origin and the known correct answer. As discussed previously, a concept map may have several paths between the origin and the correct answer.

At block 522, one of the one or more knowledge paths is selected to advance the education of the student. For example, selecting a knowledge path comprises selecting a path between the origin and the known correct answer that has a lowest cost factor.

At block 524, the present academic proficiency of the student is determined, which may be determined in various ways, as discussed previously.

At block 526, a difficulty boundary for the student is determined based on the academic factors discussed herein or by retrieving it from the student profile database 110.

The difficulty boundary translates into a maximum cost function of the next question to be posed to the student, such that the next question acts as a hint on the knowledge path to the destination. To that end, at block 528, the tutoring engine 103 provides a new question based on the difficulty boundary. For example, the difficulty boundary places a maximum cost function between the origin and the next knowledge element from which the next question is generated.

The process continues with block 504 where the response to the new question is received. The process continues iteratively until the identified destination is achieved. In one embodiment, after every iteration, the student profile database 110 is updated if the present academic proficiency of the student has changed.

Example Computer Platform

Figure 6:
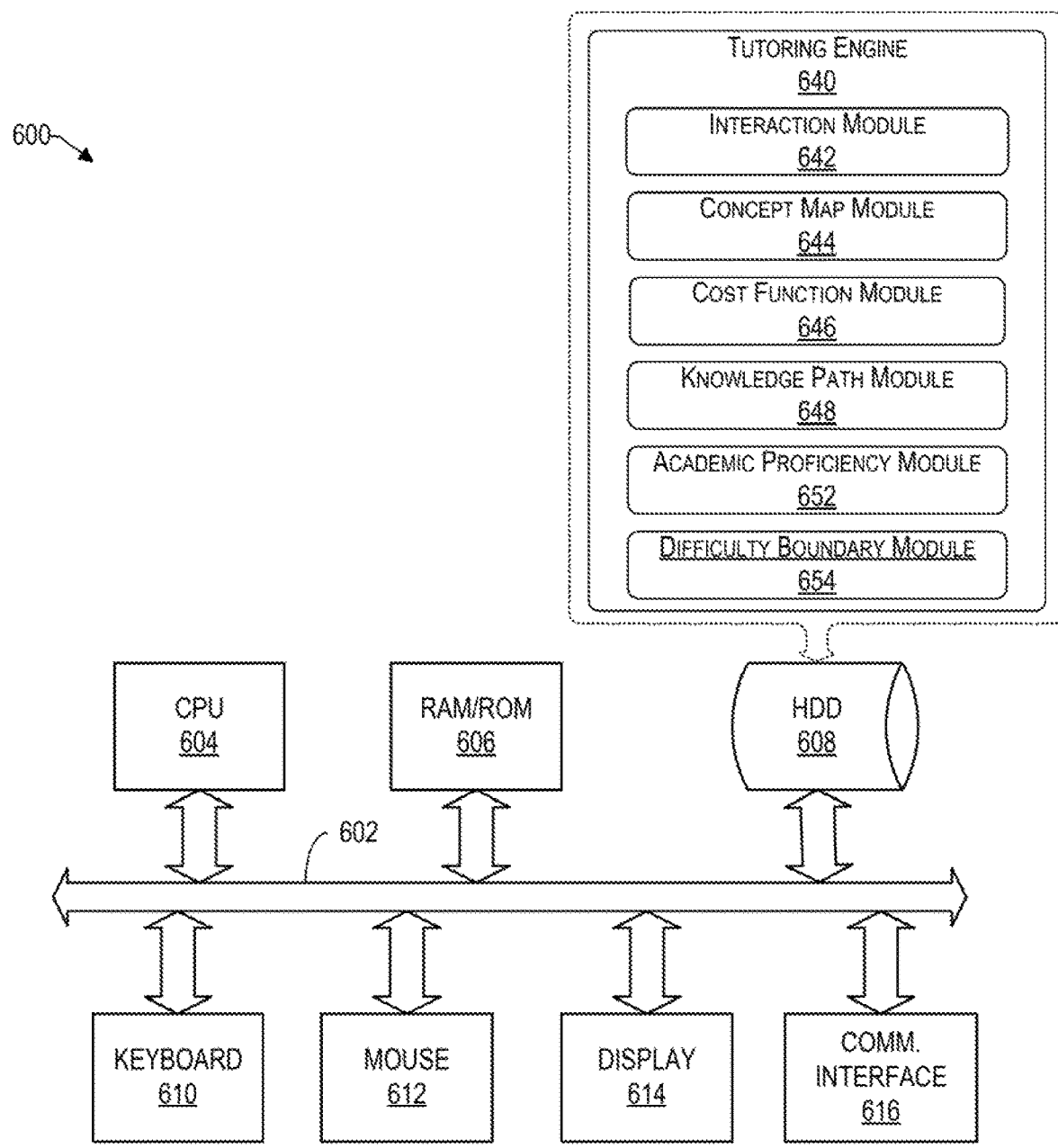
FIG. 6 provides a functional block diagram illustration of a computer hardware platform.

As discussed above, functions relating to providing an interactive and intelligent tutoring system that is adaptive to the academic proficiency of a student can be performed with the use of one or more computing devices connected for data communication via wireless or wired communication, as shown in FIG. 1 and in accordance with the process 500 of FIG. 5. An exemplary computing device in the form of a user device 200 has been discussed above with respect to FIG. 2. FIG. 6 provides a functional block diagram illustration of a computer hardware platform. In particular, FIG. 6 illustrates a network or host computer platform 600, as may typically be used to implement a server, such as the ALS 116, the concept map source 112, and the profile database 110 of FIG. 1.

The computer platform 600 may include a central processing unit (CPU) 604, random access memory (RAM) and/or read only memory (ROM) 606, a hard disk drive (HDD) 608, a keyboard 610, a mouse 612, a display 614, and a communication interface 616, which are connected to a system bus 602.

In one embodiment, the HDD 608, has capabilities that include storing a program that can execute various processes, such as the tutoring engine 640, in a manner described herein. The tutoring engine 640 may have various modules configured to perform different functions.

For example, there may be an interaction module 642 that is operative to provide questions to the student and receive responses therefrom. There may be a concept map module 644 operative to create a concept map and/or retrieve it from the concept map source 112 of FIG. 1. There may be a cost function module 646 operative to determine various cost functions, such as between a question and the known correct answer, an answer and the known correct answer, between various knowledge elements in a knowledge path, etc. There may be a knowledge path module 648 operative to determine the appropriate knowledge path from the concept map. There may be an academic proficiency module 652 operative to determine (or retrieve from the student profile database 110) the academic status of a student. There may be a difficulty boundary module 654 operative to identify (or retrieve from the student profile database 110) a maximum cost factor of the next question to be posed to the student such that the student is successfully guided to the known correct answer.

In one example a program, such as Apache™, can be stored for operating the system as a Web server. In one embodiment, the HDD 608 can store an executing application that includes one or more library software modules, such as those for the Java™ Runtime Environment program for realizing a JVM (Java™ virtual machine).

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computing device comprising:
a processor;
a network interface coupled to the processor to enable communication over a network;
a storage device coupled to the processor;
a tutoring engine software stored in the storage device, wherein an execution of the software by the processor configures the computing device to perform acts comprising:
sending a question to a user device of a student over the network such that the question is provided on a user interface of the user device;
receiving a response to the question from the user device over the network;
upon determining that the response does not correspond to a known correct answer:
identifying a concept map, comprising using concept expansion on at least one of:
(i) the first question, (ii) the known correct answer, (iii) the student response, or (iv) the subject matter of the question;
determining, from the concept map, a cost function between the correct answer and the response;
upon determining that the cost function between the correct answer and the response is above a predetermined threshold, identifying the question to be the origin;
upon determining that the cost function between the correct answer and the response is at or below the predetermined threshold, identifying the response to be the origin;
determining a present academic proficiency of the student;
determining a difficulty boundary based on the academic proficiency of the student; and
providing a next question between the origin and the correct answer, based on the determined difficulty boundary of the student.

2. The computing device of claim 1, wherein determining the cost function between the correct answer and the response is based on a knowledge path on the concept map that has a lowest cost function between the correct answer and the response.

3. The computing device of claim 1, wherein execution of the software by the processor further configures the computing device to perform acts comprising:
creating one or more knowledge paths between the origin and the correct answer; and
selecting a knowledge path from the one or more knowledge paths.

4. The computing device of claim 3, wherein selecting the knowledge path comprises selecting a path from the one or more knowledge paths between the origin and the correct answer that has a lowest cost factor.

5. The computing device of claim 3, wherein determining the present academic proficiency of the student comprises determining a cost function between the response to the correct answer on the selected knowledge path.

6. The computing device of claim 3, wherein providing the next question based on the determined difficulty boundary of the student comprises:
determining a maximum cost factor from the origin, based on the determined academic proficiency; and
identifying a question from the selected knowledge path that is within the maximum cost factor.

7. The computing device of claim 3, wherein execution of the software by the processor further configures the computing device to perform acts comprising, adaptively adjusting the difficulty boundary of a new question based on a predetermined number of correctly answered questions along the selected knowledge path.

8. The computing device of claim 1, wherein determining the present academic proficiency of the student comprises retrieving the academic proficiency from a student profile database.

9. The computing device of claim 1, wherein upon determining that the response to the question is not received from the user device within a predetermined time, identifying the question to be an origin and the known correct answer as the destination.

10. A non-transitory computer readable storage medium tangibly embodying a computer readable program code having computer readable instructions that, when executed, causes a computer device to carry out a method of providing an interactive tutoring, the method comprising:
sending a question to a user device of a student such that the question is provided on a user interface of the user device;
receiving a response to the question from the user device;
upon determining that the response does not correspond to a known correct answer:
identifying a concept map, comprising using concept expansion on at least one of: (i) the first question, (ii) the known correct answer, (iii) the student response, or (iv) the subject matter of the question;
determining, from the concept map, a cost function between the correct answer and the response;
upon determining that the cost function between the correct answer and the response is above a predetermined threshold, identifying the question to be the origin;
upon determining that the cost function between the correct answer and the response is at or below the predetermined threshold, identifying the response to be the origin;

determining a present academic proficiency of the student;

determining a difficulty boundary based on the academic proficiency of the student; and providing a next question between the origin and the correct answer, based on the determined difficulty boundary of the student.

11. The non-transitory computer readable storage medium of claim 10, wherein determining the cost function between the correct answer and the response is based on a knowledge path on the concept map that has a lowest cost function between the correct answer and the response.

12. The non-transitory computer readable storage medium of claim 10, further comprising:

creating one or more knowledge paths between the origin and the correct answer; and selecting a knowledge path from the one or more knowledge paths.

13. The non-transitory computer readable storage medium of claim 12, wherein selecting the knowledge path comprises selecting a path from the one or more knowledge paths between the origin and the correct answer that has a lowest cost factor.

14. The non-transitory computer readable storage medium of claim 12, wherein determining the present academic proficiency of the student comprises determining a cost function between the response to the correct answer on the selected knowledge path.

15. The non-transitory computer readable storage medium of claim 12, wherein providing the next question based on the determined difficulty boundary of the student comprises:

determining a maximum cost factor from the origin, based on the determined academic proficiency; and identifying a question from the selected knowledge path that is within the maximum cost factor.

16. The non-transitory computer readable storage medium of claim 12, further comprising, adaptively adjusting the difficulty boundary of a new question based on a predetermined number of correctly answered questions along the selected knowledge path.

17. The non-transitory computer readable storage medium of claim 10, wherein determining the present academic proficiency of the student comprises retrieving the academic proficiency from a student profile database.

18. The non-transitory computer readable storage medium of claim 10, wherein upon determining that the response to the question is not received from the user device in within a predetermined time, identifying the question to be an origin and the known correct answer as the destination.

* * * * *